May 6, 1941.  M. SCHLUMBERGER  2,240,520
METHOD AND APPARATUS FOR ELECTRICAL UNDERGROUND PROSPECTING
Filed May 16, 1939  2 Sheets-Sheet 2
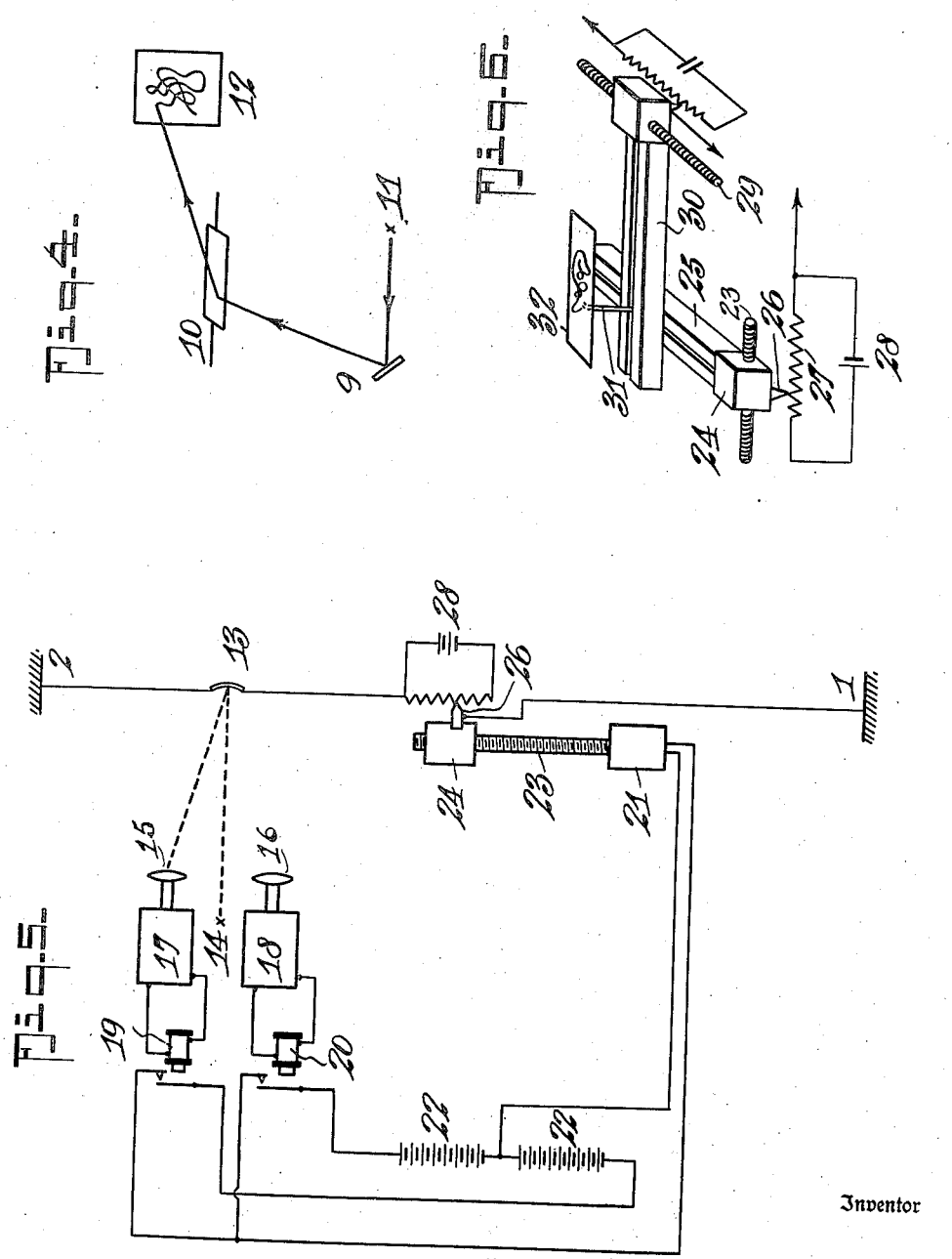
Inventor
Marcel Schlumberger.
By Ben. J. Chromy his Attorney Patented May 6, 1941

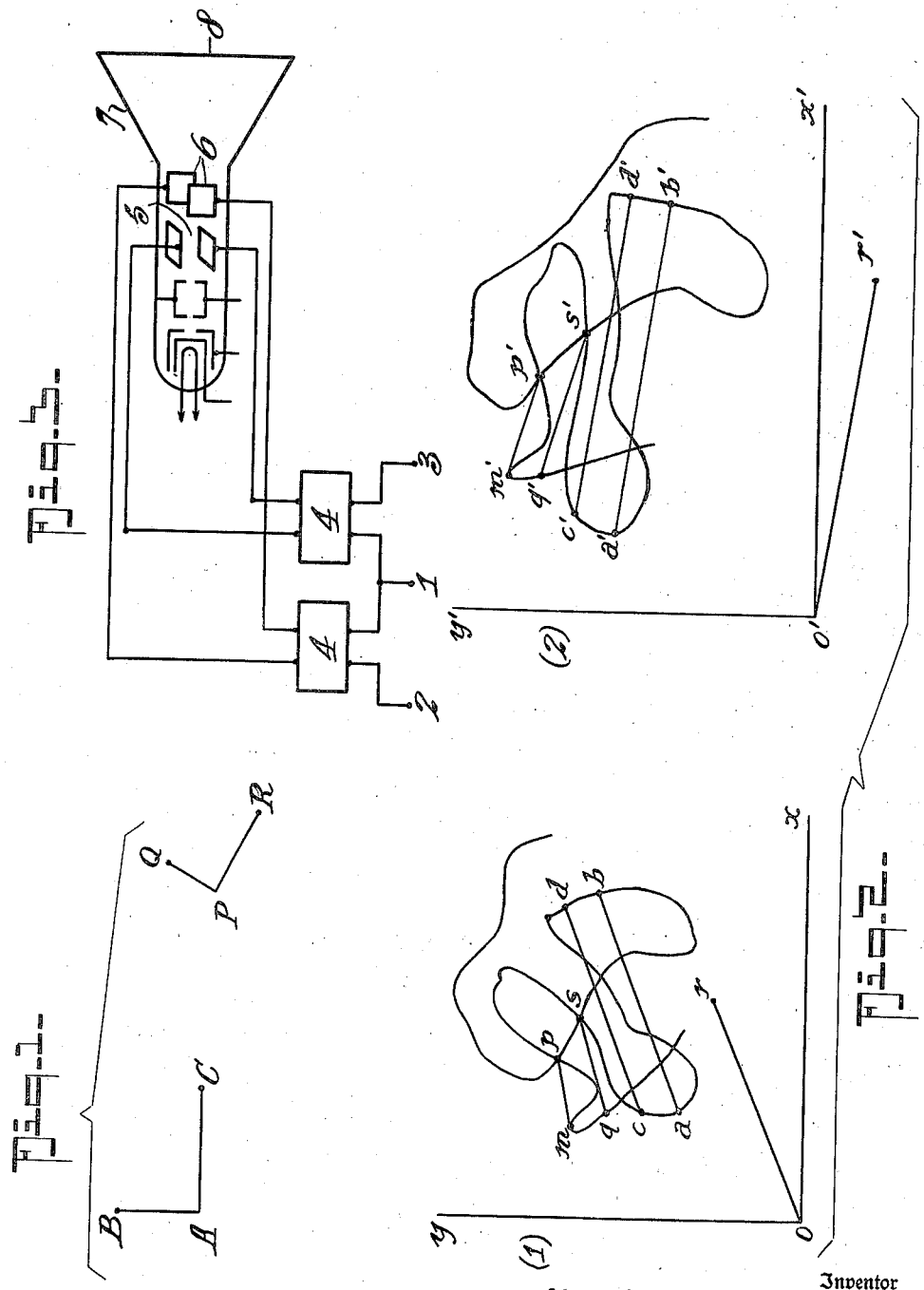

2,240,520

UNITED STATES PATENT OFFICE 2,240,520

METHOD AND APPARATUS FOR ELECTRICAL UNDERGROUND PROSPECTING

Marcel Schlumberger, Paris, France

Application May 16, 1939, Serial No. 274,046
In France February 3, 1939

11 Claims. (Cl. 175—182)

The present invention relates to methods and apparatus for the electrical prospecting of the underground in which only the electric currents flowing naturally through the ground and called "telluric currents" are made use of, the use of any artificial field being excluded.

The methods according to the present invention are of the same kind as those set forth in a prior Patent No. 2,034,447, of March 17, 1936.

This prior patent described various methods which have in common the fact that a comparison is made, at the different points of the area to be surveyed, between the telluric fields at these points at the same moment, or between the variations of these telluric fields at said points, during a same given period of time.

The known method which is the simplest for measuring the telluric field at a given point consists in placing two pairs of electrodes on the surface of the ground, the direction of the line passing through the electrodes of one of said pairs being at right angles to the direction of the line passing through the electrodes of the other pair, measuring the differences of potential between the electrodes of each of these pairs, thus obtaining the values of the components of the telluric field along the two corresponding directions.

The measurement apparatus most commonly used, for determining the telluric field at a given point, are galvanometers which record on a film the differences of potential between the two electrodes of a pair as a function of time.

Generally, the method is carried out at a fixed spot, chosen arbitrarily and called "fixed station," the telluric field being measured at this station, and the telluric fields are measured simultaneously at different spots (called movable stations) over the area to be surveyed. If the directions of the pairs of electrodes are chosen so as to be respectively parallel two by two, the records obtained on two parallel pairs, even if the two stations are several kilometers apart, can, as a rule, be superposed to one another, after suitable amplification of the ordinates of one of them. This results from the fact that one component of the field is relatively constant in one direction on the ground surface, over a very large area.

In this case, the accurate synchronizing of the records obtained, which is necessary for their interpretation, is obtained very easily by moving one of the films along the other until the maximums or minimums of the curves coincide. It is also possible to obtain the synchronism roughly in another way by means of a plurality of characteristic marks made during the recording on the films at the two stations, at times given by two watches which are substantially in accordance.

If the pairs of electrodes cannot be placed along respective parallel lines (due to difficulties resulting from the nature of the ground) or if one component of the field along one of the pairs of electrodes of the fixed station no longer remains parallel to itself at the movable station (due to lack of homogeneity of the underground creating a distortion of the field between the two stations, this being, of course, the more considerable as the distance between the two stations is greater), the curves obtained along any two pairs in the first case, or along two pairs which may be parallel, in the second case, have, as a rule, but little similarity so that it is not possible to obtain a correct synchronization by mere comparison of these curves.

Considerable graphic difficulties of interpretation then occur; furthermore, it is necessary to ensure a very accurate artificial synchronization of the curves, for instance at the expense of a telephonic or radio-telegraphic connection between the operation at the fixed station and that at the movable station. This connection permits of inscribing on the film marks which are exactly simultaneous. The use of chronometers has been found insufficient in the field for practical purposes, due to disturbances to the working thereof produced by their transportation. Another way of overcoming this difficulty consists in choosing for the two stations, as a whole, by successive approximations, couples of pair of electrodes which are suitably positioned for restoring the similarity of the records obtained.

The chief object of the present invention is to provide a method which eliminates all requirements concerning the perfect synchronization of the records and the choice of the directions of the pairs of electrodes and obviates all graphical measurement difficulties.

Other advantages to be obtained according to the present invention will result from the following detailed description of some specific embodiments thereof.

Preferred embodiments of the present invention will be hereinafter described, with reference to the accompanying drawings, given merely by way of example, and in which:

Fig. 1 diagrammatically shows the arrangement of the stations;

Fig. 2 shows diagrams corresponding to the recorded curves;

Fig. 3 shows an embodiment of the curve recording apparatus, including a cathode oscillograph;

Fig. 4 shows another embodiment including optical means;

Fig. 5 shows, in a diagrammatic manner, still another embodiment of a device for carrying out the invention, including a servo-motor arrangement;

Fig. 6 shows a detail of Fig. 5.

On all of these figures, the same reference characters designate the same elements.

According to the present invention, I provide on the ground, firstly at a fixed station, three grounding means, A, B and C, and, on the other hand, at a movable station, three other grounding means P, Q and R. Triangles ABC and PQR are right angle triangles, the apices of the right angles being A and P, respectively. The directions of these triangles on the ground are not imposed and are therefore determined solely by the geophysical problem to be studied.

As explained in the prior patent above referred to, the telluric currents produce, between A—B and A—C on the one hand, P—Q and P—R on the other hand, differences of potential $V_{AB}$, $V_{AC}$, $V_{PQ}$ and $V_{PR}$ the value of which varies constantly as a function of time.

The essential feature of the present invention consists in automatically recording, at the fixed station, the curve described by a point the abscissa of which is the difference of potential $V_{AB}$ and the ordinate of which is the difference of potential $V_{AC}$. I operate exactly in the same manner at the movable station, where, therefore, the curve gives the variation of the position of the representative point the abscissa of which is $V_{PQ}$ and the ordinate $V_{PR}$.

Fig. 2 shows an example of the records corresponding to the curves thus obtained, at (1) for station A and at (2) for station P. These curves have, for instance, the shape indicated by the drawings and they include several angular points, such as $m$, $m'$ and double points such as $p$, $p'$.

The abscissae along axes $Ox$, $O'x'$, are respectively proportional to values $V_{AB}$ and $V_{PQ}$. It is advantageous to choose identical scales for the measurements along both of the axes of each system of coordinates because, in this case, the directions of the vectors extending from the origin to a representative point are parallel (after the axes have been suitably directed and provided that triangles ABC and PQR are isosceles) to the directions of the telluric field at this time in the ground.

Of course, the double points of the curves correspond to times at which the field again assumes the same value, both in magnitude and in direction. The angular points correspond to sudden variations of the direction of the field.

A compared examination of the curves thus plotted permits of deducing therefrom the "potential map" and, consequently, the values of the relative mean resistivity of the underground, with an accuracy which, as a rule, is higher than that obtained through the methods set forth in the above mentioned prior patent.

This compared examination is based upon the experimentally found properties of telluric currents. These properties, which were already indicated in said prior patent, derive from the essential fact that telluric currents comply with the principle of superposition of states.

Therefore, it follows that, if these currents have, at a given point M, at two different times, the same direction D, they also come back, at the same times, at another point M', to the same direction D'. These directions D and D', which as a rule are not parallel to each other, are called conjugate directions for places M and M'.

Furthermore, the ratio of the fields at the times considered at these various points is constant for the couple of conjugate directions.

Now, considering two points $a$ and $a'$ (Fig. 2) on the respective curves obtained on the records, at the same time of recording $t$, and two other points $b$ and $b'$, corresponding to another time $t'$.

It follows from the above mentioned properties that the telluric field resulting from the vectorial difference of the two real fields at times $t$ and $t'$ would give respective representative points $r$ and $r'$ such that the vector $Or$ is parallel and equal to $ab$, while the vector $O'r'$ is parallel and equal to $a'b'$.

It follows that, considering two other points $c$ and $c'$ of the respective curves, corresponding to another time, and if I trace lines $cd$, parallel to $ab$, and $c'd'$, parallel to $a'b'$, the points of intersection of these lines with the respective curves correspond to the same time of recording. Furthermore, the numerical values of the ratios of the lengths of the chords are equal, in other words $$\frac{a-b}{a'-b'}$$

is equal to $$\frac{c-d}{c'-d'}$$

this condition being true whatever be the point $c$ that is considered.

The ratio between these lengths is equal to the ratio of the values of the fields produced by the telluric currents existing at the stations for this pair of conjugate directions and it constitutes one of the measurements to be obtained.

In other words, after transferring the origins of the system of coordinates at arbitrary points $a$ and $a'$, respectively, these curves constitute polar representations of the variations of telluric fields from the original states characterized by the initial coordinates $a$ and $a'$ of these points.

It would seem that this method will further call for the determination of the points marked at two corresponding times. But for practical purposes, this is extremely easy because there are points on the curves which undeniably correspond to each other, respectively, for instance angular points such as $m$ and $m'$, where the direction of the curve changes suddenly, or double points such as $p$ and $p'$. As a matter of fact, it is clear that, if the direction of the field changes suddenly at one of the stations, the same variation occurs simultaneously at the other station and, if the field vector comes back to the same value in magnitude and in direction at one of the stations, the same occurs at the other station.

Accordingly, it will suffice to trace the curves, and, then lines $mp$ and $m'p'$, join together points which have certainly been marked at the same time. The ratio of the lengths $mp$ and $m'p'$ therefore constitutes one of the desired measurements.

Furthermore, as above explained, if the scales are the same for the abscissae and the ordinates, and if triangles ABC and PQR are isosceles triangles, the directions of the straight lines above mentioned are respectively parallel to the conjugate directions on the ground, so that these directions are thus determined.

Besides, it should be noted that, if lengths A—B and A—C are unequal, the above mentioned result can still be obtained by taking unequal values for the scales of the abscissae and of the ordinates, the ratio of these scales being equal to the reverse of ratio $$\frac{AB}{AC}$$

that is to say to $$\frac{AC}{AB}$$

The same remark also applies to the other station P—Q—R.

It will be noted that the measurements that are thus made can be used for mutually checking one another. Considering two other corresponding points $s$ and $s'$, and lines $qs$ and $q's'$, parallel to $mp$ and $m'p'$, the ratio of $qs$ and $q's'$ must be equal to the ratio of $mp$ and $m'p'$.

The recording of the curves as described above can be obtained in various ways, some of which will be indicated, merely by way of example.

The electrodes of the station are located at the apices of a right-angled triangle. In Figs. 3 to 6, they are indicated by 1, 2 and 3, and they correspond to ABC or PQR of Fig. 1.

With the apparatus according to Fig. 3, the differences of potential created by the telluric currents between 1 and 2 and 1 and 3 are amplified by amplifiers 4 the output terminals of which are connected with two respective pairs of plates 5 and 6 (one of which is perpendicular to the plane of the drawings) of a cathodic oscillograph 7.

Such an arrangement is well known in the art and is considerably used, for instance, in the art of television.

It follows that the spot of the cathode ray is deviated, in two directions perpendicular to each other, from quantities respectively proportional to the potential differences $V_{AD}$ and $V_{AC}$ produced, between electrodes 1 and 2, and 1 and 3, by the telluric currents.

Consequently, a photographic paper of plate applied against the glass envelope of the cathode ray tube, opposite the fluorescent screen 8 thereof, will record the desired curve.

Of course, such apparatus are provided at both stations.

Fig. 4 diagrammatically shows an optical recording device which is also well known in itself. The potential difference existing between electrodes 1 and 2 produces a deviation of a galvanometer the mirror 9 of which has a vertical axis of rotation. The potential difference existing between 1 and 3 produces a deviation of a second galvanometer the mirror 10 of which turns about an horizontal axis.

A light ray, issuing from a source 11, strikes the first mirror 9, then the second mirror 10 and is recorded on a photographic plate 12, located at a suitable place. Mirror 10 is of sufficient length, in the direction of the axis about which it pivots, to ensure that the light ray deviated by 9 always strike this mirror 10.

It is unnecessary further to describe the operation of this device, which is well known in the art. Of course, amplifiers may be inserted between the grounding means and the galvanometers.

It is also possible to make use of a device including a servo-motor (Figs. 5 and 6) working as an automatic potentiometer.

In this case also, I make use of a galvanometer (provided if necessary with an amplifier) the mirror 13 of which is deviated through an angle proportional to the voltage at its terminals.

This mirror 13 projects, according to the direction of its deviation, a light ray coming from source 14 on to one or the other of the photoelectric cells 15 and 16 placed on either side of source 14, respectively. The currents leaving these cells are amplified at 17 and 18 and they operate relays 19 and 20 which actuate (in one direction or the other according to which of the relays has been energized) motor 21, fed with current by battery 22.

This motor drives an endless screw 23 which displaces longitudinally, by means of a nut 24, a carriage 25 supporting, in particular, a sliding contact 26 adapted to cooperate with a resistance 27 which acts as a potentiometer, by means of battery 28. This potentiometer is inserted in series in the circuit of the ground connections 1 and 2 of the galvanometer the mirror of which is shown at 13 on the drawings.

It will be readily understood that, with such a device, the motor will be at rest only when the galvanometer is not deviated in one direction or the other, which occurs only when the voltage across the terminals of the potentiometer is exactly equal, in magnitude, and opposed, to that created by the telluric currents between electrodes 1 and 2. Consequently, the displacement of carriage 25 is exactly proportional, at any time, to the difference of potential between electrodes 1 and 2.

Therefore, in order to obtain the desired curve, it suffices to place a similar device between electrodes 1 and 3. The endless screw 29 of this second device (Fig. 6) actuates a second carriage 30 which slides in a direction perpendicular to the first. These two carriages, as indicated by the drawings, are provided with rectilinear slots or grooves. A pin provided at its end with a stylus 31 is automatically positioned at the point of intersection of these two grooves.

It is clear that the displacements of this element 31 record the desired curve since its abscissa and its ordinate are respectively proportional to the differences of potential existing between 1 and 2 on the one hand, and between 1 and 3 on the other hand. This curve is inscribed on sheet 32, which is placed in a suitable manner.

Thus, the desired curves are obtained by means of any of the above devices.

This method of prospecting therefore eliminates any necessity for accurate synchronization between the stations. It permits of obtaining highly accurate measurements. Finally, it has the advantage that the set-up is identical at each station to one another.

Furthermore, this method is very easy to carry out. It is necessary only to adjust the apparatus and to start it. It can then be left to itself during the recording, and it is only necessary to come and take the curves that have been automatically traced.

In this recording method, which might be called a polar method, the curves that are obtained when the apparatus have to work without interruption for a long time might be somewhat intricate. In order to obviate this drawback, I may perform the recording simultaneously at both the stations only for a limited period of time (say twenty minutes) at predetermined hours.

Besides, it should be noted that, in the case of continuous recording, it is possible to clarify the curves if the precaution has been taken to produce characteristic marks on the tracings, for instance by temporarily stopping the recording, say for some instants, at both stations, substantially simultaneously at predetermined times. The synchronism of these signals need not be extremely accurate for obtaining the desired result.

In a general manner, while I have, in the above description, disclosed what I deem to be practical and efficient embodiments of the present invention, it should be well understood that I do not wish to be limited thereto as changes might be made in the arrangement, and form of the parts without departing from the principle of the present invention as comprehended within the scope of the accompanying claims.

What I claim is:

1. A method of electrically prospecting the underground which comprises, simultaneously recording the relative magnitudes of the telluric fields at two different stations of the area to be surveyed, the respective curves of said recording each described by a point the coordinates of which are proportional to the respective values of the components of the telluric field at said stations along two axes of coordinates, the system of coordinates being the same at the two stations respectively.

2. A method of electrically prospecting the underground which comprises simultaneously recording the relative magnitudes of the telluric fields at two different stations of the area to be surveyed, the respective curves of said recording each described by a point the coordinates of which are proportional to the respective values of the components of the telluric field at said stations along two rectangular axes of coordinates.

3. A method of electrically prospecting the underground which comprises placing, at each of two different stations of the area to be surveyed, three grounding means located respectively at the apices of a right-angled triangle, and simultaneously recording the relative magnitudes of the telluric fields at each of said two stations, the curves of each of said recordings each being described by a point the coordinates of which are proportional, respectively, to the differences of potential measured between the grounding means at the apex of the right angle of the triangle, on the one hand, and the two other grounding means respectively, on the other hand.

4. A method of electrically prospecting the underground which comprises placing, at each of two different stations of the area to be surveyed, three grounding means located respectively at the apices of a right-angled isosceles triangle, and simultaneously recording the relative magnitudes of the telluric fields at each of said two stations, the curves of each of said recordings each being described by a point the coordinates of which are proportional, respectively, to the differences of potential existing between the grounding means at the apex of the right angle, of the triangle, on the one hand, and the two other grounding means respectively, on the other hand.

5. A method of electrically prospecting the underground which comprises simultaneously recording the relative magnitude of the telluric fields at two different stations of the area to be surveyed, the respective curves of said recordings each described by a point the coordinates of which are proportional to the respective values of the components of the telluric field at said stations along two axes of coordinates, the system of coordinates being the same at the two stations, respectively, and simultaneously tracing on said curves marks produced at approximately the same time at both stations.

6. A method of electrically prospecting the underground which comprises placing, at each of two different stations within the area to be surveyed, three grounding means located respectively at the apices of a right-angled triangle, and simultaneously recording the relative magnitudes of the telluric fields at each of said stations, the curves of said recordings each being described by a point the coordinates of which are proportional, respectively, to the differences of potential existing between the grounding means at the apex of the right angle of the triangle, on the one hand, and the two other grounding means respectively, on the other hand, the recording being temporarily stopped for a short time, at intervals, substantially simultaneously at both stations.

7. A method of electrically prospecting the underground which comprises simultaneously recording, for limited periods of time, the relative magnitudes of the telluric fields occurring simultaneously at two different stations of the area to be surveyed, the respective curves recorded each being described by a point the coordinates of which are proportional to the respective values of the components of the telluric field at said stations, along two axes of coordinates, the system of coordinates being the same at the two stations.

8. A method of electrically prospecting the underground which comprises simultaneously recording the relative magnitudes of the telluric fields at two different stations of the area to be surveyed, for the same limited period of time, the respective curves recorded each being described by a point the coordinates of which are proportional to the respective values of the components of the telluric field at said stations, along two axes of coordinates, the system of coordinates being the same at the two stations, and temporarily stopping the recording for a short time, at intervals, simultaneously at both stations.

9. A system for the electrical recording of the telluric field at a station which comprises, in combination, three grounding means, two galvanometers mounted between one of said grounding means, on the one hand, and the two other grounding means, respectively, on the other hand, an electric motor associated with each of said galvanometers, a carriage movable by said motor in one direction or the opposite one, respectively, a source of current for said motor, two relays adapted to connect said source of current with said motor in opposite directions, respectively, said relays being adapted to be energized by said galvanometer, alternately, according to the direction of deviation of said galvanometer, a potentiometric device inserted in said galvanometer, and arranged to be controlled by said movable carriage, so that the displacements of said carriage are proportional to the variations of potential between the two corresponding grounding means, the carriages corresponding to the two galvanometers, respectively being movable in directions perpendicular to each other, respectively, a longitudinal groove in each of said carriages, and a recording pin perpendicular to the displacements of both of said carriages and engaging in the respective grooves of both of them.

10. A system according to claim 9 further including a mirror carried by each of said galvanometers a source of light located between said relays, and photo-electric cells associated with said relays for operating them when receiving a light beam reflected from said mirror.

11. A system for the electrical recording of the telluric field at a station which comprises, in combination, three grounding means, two galvanometers, one of said grounding means being common to both of said galvanometers, and means for connecting one of said galvanometers to one of the other of said grounding means and the other of said galvanometers to the remaining one of said grounding means, said grounding means being disposed at the apexes of a right angle triangle, a recording device, and means controlled by both of said galvanometers for moving said recording device to produce a record of the telluric field.

MARCEL SCHLUMBERGER.